Aug. 28, 1956     J. GLADSTONE     2,760,754
SLIDE VALVE FOR GARDEN HOSE
Filed Jan. 3, 1956
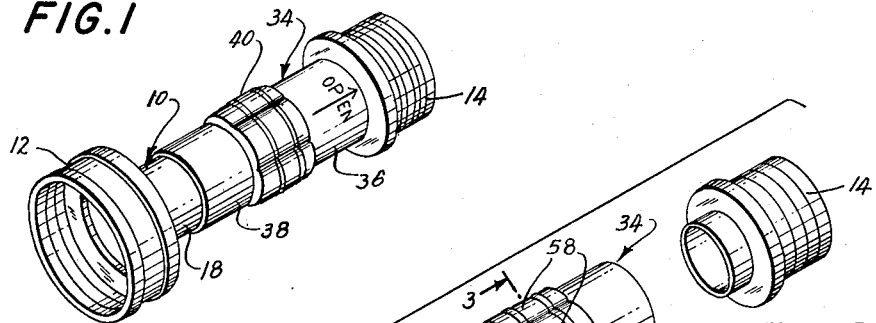
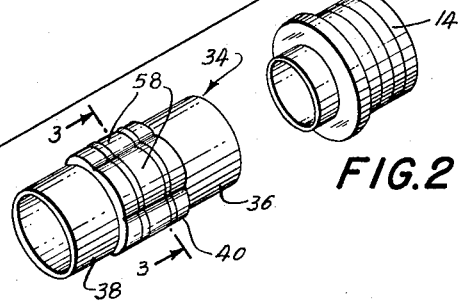
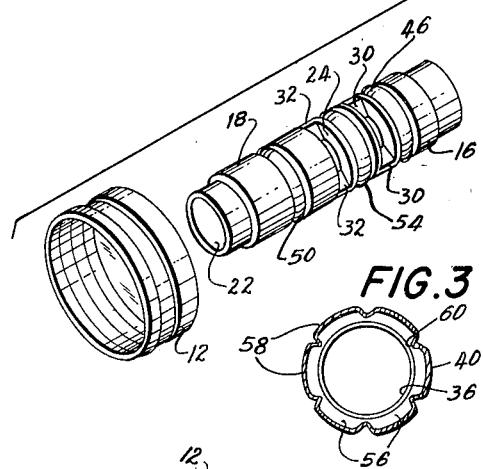
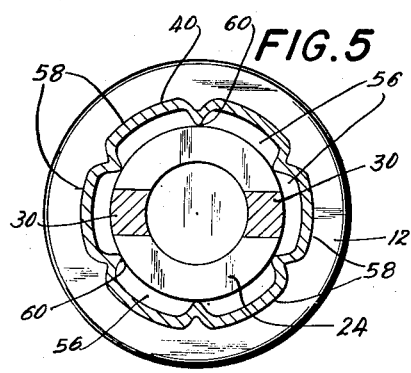
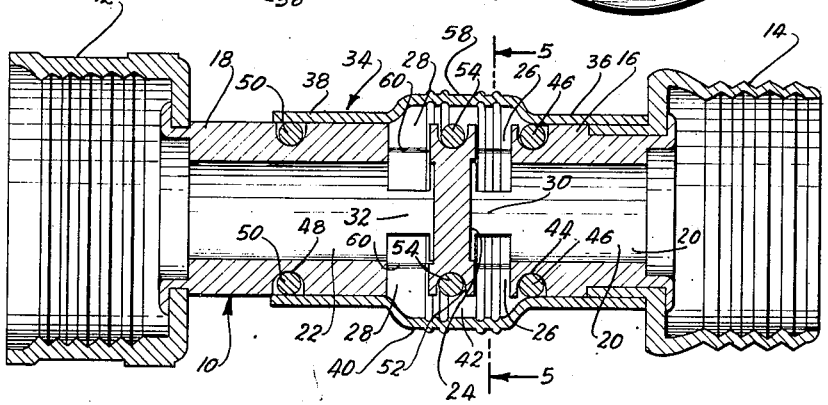
INVENTOR.
JOSEPH GLADSTONE
ATTORNEY United States Patent Office 2,760,754
Patented Aug. 28, 1956

2,760,754

SLIDE VALVE FOR GARDEN HOSE

Joseph Gladstone, Flushing, N. Y., assignor to Melnor Metal Products Co., Inc., Long Island City, N. Y., a corporation of New York Application January 3, 1956, Serial No. 557,138

2 Claims. (Cl. 251—344)

This invention relates to a slide valve and more particularly to a slide valve especially adapted for garden hose.

The type of garden hose slide valve to which the present invention pertains comprises a tubular body having hose connections at its opposite ends, said tubular body being formed with two sections defining inlet and outlet passages, a blocking partition between said sections and ports in the walls of said sections on opposite sides of said partition; and slidably mounted on said tubular body is a sleeve having opposite end sections which closely fit the exterior walls of the tubular body sections and an intermediate enlarged section defining a passage which is adapted to bridge said ports, the sleeve being slidable to open and close communication by way of the passage in said enlarged section between the inlet and outlet passages of said tubular body. Suitable sealing rings are mounted, preferably seated in the tubular body, between said tubular body and the slidable sleeve, one of such sealing rings being located over and mounted in the plane of said partition.

I have found that in such a slide valve, under certain operating conditions, forces are created during a flow of water through the valve, which tend to unseat and dislodge the sealing ring which is located over the partition, interfering with the free flow of the water and at times rendering the valve inoperative. The prime object of the present invention centers about improving the construction of such a valve so that all tendency for unseating and dislodging the sealing ring is eliminated and said sealing ring is retained in its groove or seat under all conditions of operation.

To the accomplishment of the foregoing object and such other objects as may hereinafter appear, my invention relates to the slidable valve as sought to be defined in the appended claims and taken together with the following description thereof and the accompanying drawings, in which:

Fig. 1 is a perspective view of the slide valve with the parts shown in valve open position;

Fig. 2 is a perspective and exploded view of the parts of the slide valve;

Fig. 3 is a view of a part of the valve structure taken in cross-section in the plane of the line 3—3 of Fig. 2;

Fig. 4 is a longitudinal cross-sectional view of the slide valve shown to an enlarged scale and showing the valve in open position; and Fig. 5 is a view thereof taken in cross-section in the plane of the line 5—5 of Fig. 4.

Referring now more in detail to the drawings, the slide valve of the present invention comprises a valve unit such as is depicted in Figs. 1 and 5 which is adapted for attachment at its opposite ends to two sections of a garden hose at a point or region thereof intermediate the faucet and nozzle ends of the hose.

The fixed part of this valve unit comprises a tubular body generally designated as 10 having hose couplings 12 and 14 at its opposite ends, said tubular body consisting of two sections 16 and 18 defining inlet and outlet passages 20 and 22 respectively, said tubular body being formed between said sections and passages with a blocking wall or partition 24 and with radial ports 26 and 28 on opposite sides of said partition 24. The blocking partition 24 is joined to the tubular sections 20 and 22 by bridging elements 30 and 32 respectively. The hose couplings 12 and 14 are fixedly united to the tubular body 10 in any approved manner such as is best shown in Fig. 4 of the drawings.

The movable part of this valve unit comprises a sleeve generally designated as 34 mounted on said tubular body 10 and slidable longitudinally thereon, the said sleeve being provided or formed with opposite end sections 36 and 38 closely fitting the exterior walls of the tubular sections 16 and 18 respectively and with an intermediate enlarged section 40 defining a passage means 42 which is adapted to bridge the radial ports 26 and 28 as most clearly shown in Fig. 4 of the drawings. The sleeve 34 is slidable on the tubular body 10 to open and close communication by way of the passage means 42 in the enlarged section 40 between the inlet and outlet passages 20 and 22 of the valve body. In the position shown in Figs. 1 and 5 of the drawings, with the sleeve end 36 engaging and being stopped by the hose coupling 14 the valve structure is open, there being communication between the inlet passage 20 and the outlet passage 22 by way of the ports 26 and 28 and the passage means 42. When the sleeve 34 is slid on the tubular body 10 to its opposite position with the sleeve end or section 38 in engagement with and stopped by the hose coupling 12 the valve is closed, the sleeve end or section 36 being then in a position to bridge the ports 26 thus closing or shutting off communication between the inlet and outlet openings 20 and 22.

To provide a liquid seal between the fixed and movable valve parts sealing rings are provided, these being preferably mounted and seated in the tubular body of the valve and arranged between said tubular body and the slidable sleeve. For this purpose the tubular section 16 is formed with an external annular groove 44 in which is seated a rubber sealing ring or gasket 46, the tubular section 18 is similarly formed with an external annular groove 48 in which is seated a rubber sealing ring or gasket 50 and the blocking partition 24 is formed with an external annular groove 52 in its rim in which is seated a rubber sealing ring or gasket 54, the said sealing ring being thus located in the plane of the partition 24. These sealing rings form liquidproof seals in the operation of the valve.

Under certain operating conditions, particularly when the position of the valve is reversed as when the inlet end of the valve is inadvertently employed as the outlet end, a surge of water flowing through the valve structure in the opening of the valve creates forces which tend to unseat and dislodge the partition located sealing ring 54, with the result that the free flow of water through the valve structure is interfered with and at times rendering the valve inoperative. I have found that this tendency for unseating and dislodging the sealing ring 54 may be entirely eliminated and the sealing ring retained in its groove or seat under all conditions of operations by longitudinal fluting the body wall of the intermediate enlarged section 40 and the sleeve 34. The said intermediate section 40 is therefore fluted to provide a plurality (here shown six in number) of longitudinal passages 56, 56, the flutes 58, 58 of the fluted sections having bottoms 60, 60 which lie in close proximity to the sealing ring 54. By this means the flutes function dually as the passage means between the inlet and outlet passages 20 and 22 and as a means for preventing dislodgment or unseating of the sealing ring 54 in all positions of the slidable sleeve 34.

Furthermore by longitudinally fluting the body wall of the enlarged section of the sleeve of the slide valve, not only are the valve passages 56, 56 formed internally of said section with bottoms 60, 60 which function as described in connection with the sealing ring 54, but an outside wall formation is produced as typically shown in Fig. 1 of the drawings in the nature of a knurled piece which may be conveniently grasped by the users' fingers for rotating while sliding the sleeve 34 between open and closed positions.

The construction and operation of the slide valve of the present invention will in the main be fully apparent from the above detailed description thereof. It will be further apparent that changes may be made therein without departing from the spirit of the invention as defined in the following claims.

I claim:

1. A slide valve for garden hose and the like comprising a tubular body provided with longitudinal inlet and outlet passages, a transverse blocking partition intermediate said passages and ports in the wall of said tubular body on opposite sides of said partition, an external annular groove in the wall of said tubular body lying in the plane of said partition, a sealing ring in said groove, a sleeve longitudinally slidable on said tubular body, said sleeve being provided with opposite end sections closely fitting the exterior wall of said tubular body and with an intermediate enlarged section, the body wall of said enlarged section being longitudinally fluted, said sleeve being slidable between a position with the fluted section located over said ports with the flutes thereof defining passages for opening communication between said inlet and outlet passages and a position with one of the end sections over said ports for closing such communication, the flutes of the fluted section having bottoms which lie in close proximity to said sealing ring to retain the same in its said groove against forces tending to dislodge the same, the outside wall of said enlarged section having a knurled configuration due to the formation of the internal fluted passages.

2. A slide valve for garden hose and the like comprising a tubular body formed with two sections defining longitudinal inlet and outlet passages, a transverse blocking partition intermediate said sections and ports in the walls of said sections on opposite sides of said partition, an external annular groove in the wall of each tubular section, a sealing ring in each of said grooves, a third external annular groove in the wall of said tubular body lying in the plane of said partition, a sealing ring in said latter groove, a sleeve longitudinally slidable on said tubular body, said sleeve being provided with opposite end sections closely fitting the exterior walls of and the sealing rings in the two sections of said tubular body and with an intermediate enlarged section, the body wall of said enlarged section being longitudinally fluted, said sleeve being slidable between a position with the fluted section located over said ports with the flutes thereof defining passages for opening communication between said inlet and outlet passages and a position with one of the end sections over said ports overlying two adjacent sealing rings for closing such communication, the flutes of the fluted section having bottoms which lie in close proximity to the sealing ring in said third annular groove to retain the same in its said groove against forces tending to dislodge the same, the outside wall of said enlarged section having a knurled configuration due to the formation of the internal fluted passages.

References Cited in the file of this patent

UNITED STATES PATENTS

| | | |
|---|---|---|
| 2,485,504 | Morgan | Oct. 18, 1949 |
| 2,505,410 | Klaas | Apr. 25, 1950 |
| 2,710,606 | Jenny | June 14, 1955 |

FOREIGN PATENTS

| | | |
|---|---|---|
| 1,097,717 | France | of 1955 |